United States Patent [19]

Lyons et al.

[11] 4,188,276

[45] Feb. 12, 1980

[54] VOLTAGE STABLE POSITIVE TEMPERATURE COEFFICIENT OF RESISTANCE CROSSLINKED COMPOSITIONS

[75] Inventors: Bernard J. Lyons, Atherton; Young J. Kim, East Palo Alto, both of Calif.

[73] Assignee: Raychem Corporation, Menlo Park, Calif.

[21] Appl. No.: 601,550

[22] Filed: Aug. 4, 1975

[51] Int. Cl.$^2$ ............................................... C08F 8/00
[52] U.S. Cl. .............................. 204/159.17; 252/502; 252/511; 260/42.32; 260/42.41
[58] Field of Search .................... 260/884, 885, 42.32, 260/42.41, DIG. 15, DIG. 21; 204/159.17; 252/501, 502, 511

[56] References Cited

U.S. PATENT DOCUMENTS

| 3,166,688 | 1/1965 | Rowand et al. | 260/DIG. 15 |
|---|---|---|---|
| 3,259,688 | 7/1966 | Towne et al. | 204/159.17 |
| 3,269,862 | 8/1966 | Lanza et al. | 204/159.17 |
| 3,351,882 | 11/1967 | Kohler et al. | 252/511 X |
| 3,580,829 | 5/1971 | Lanza | 204/159.17 |
| 3,840,619 | 10/1974 | Aronoff et al. | 260/878 R |
| 3,846,267 | 11/1974 | Tabata et al. | 204/159.17 |
| 3,864,228 | 2/1975 | Rossetti | 204/159.20 |
| 3,894,118 | 7/1975 | Arnoff et al. | 260/884 |
| 3,923,621 | 12/1975 | Murayama et al. | 204/159.17 |
| 3,993,842 | 11/1976 | Hirsch et al. | 252/511 X |
| 4,002,595 | 1/1977 | Adelman | 252/511 X |
| 4,017,715 | 4/1977 | Whitney et al. | 252/511 X |

Primary Examiner—Richard B. Turer
Attorney, Agent, or Firm—Lyon & Lyon

[57] ABSTRACT

The voltage stability of crosslinked compositions of fluorocarbon polymers and conductive carbon black that exhibit a positive temperature coefficient of resistance can be improved by incorporating into the composition prior to its crosslinking an effective amount of a polymerizable polyethylenically unsaturated monomer such as, for example, triallylisocyanurate.

33 Claims, 5 Drawing Figures

VOLTAGE STABLE POSITIVE TEMPERATURE COEFFICIENT OF RESISTANCE CROSSLINKED COMPOSITIONS

FIELD OF THE INVENTION

This invention relates to compositions having positive temperature coefficients of resistance and the method by which they are made. In another aspect it relates to compositions useful in self-regulating heating elements. In yet another aspect, it relates to compositions of a fluorocarbon polymer and carbon.

BACKGROUND

Polymer compositions that contain particles of a metal or cconductive carbon may be electrically conductive. Many such compositions, particularly those having a crystalline polymer base, exhibit the property that, as their temperature is raised, a substantial rise in the compositions' electrical resistance occurs at a specific temperature or over a relatively narrow temperature range. In the case of compositions based upon crystalline polymers, this phenomenon is exhibited at or near the crystalline melting point or melting range.

Compositions that exhibit this property are said to possess a positive temperature coefficient (PTC) of resistance. The compositions themselves are frequently referred to as PTC compositions.

In recent years, PTC compositions have been usefully employed as components in self-regulating heating elements for electrical appliances having a variety of applications. In operation, at a constant applied voltage directed across a PTC heating element, the current ($I=E/R$) through the heater will be large at low temperature. The power (P) generated by this current ($P=I^2R$) is dissipated as Joule heat thereby warming the PTC composition. If the applied voltage is high enough, the temperature will continue to rise without a significant increase in resistance until the $T_s$ temperature is reached. At this point, a further increase in temperature results in a significant rise in resistance. Since the applied voltage is constant, concomitant with the increase in resistance is a large decrease in current and, therefore, power generation. In effect then, the heater is switched off.

The heat built up in the PTC composition dissipates by heating its surroundings, which might, for example, be a heating plate for a coffee pot, until its temperature drops below $T_s$ at which point the power output of the heater again rises. In actual practice, a steady state condition is attained at about the $T_s$ temperature as heat lost to the surrounding is offset by heat being generated within the PTC composition. The net effect of all this is that the power being generated by the current in the PTC composition remains relatively constant as does its heat output without resort to thermostats or a protective device such as a fuse.

To those skilled in the art, the availability of simple self-regulating heating devices that do not require expensive and/or bulky heat control devices suggests many applications for heating elements comprising PTC compositions. A particularly useful element takes the form of a thin ribbon or strip of carbon filled polymeric material having electrodes at its opposite edges, typically bundles of copper wires embedded in the polymer strip along its edges, parallel to the long axis of the strip. The two electrodes establish a potential gradient along the plane of the strip and transverse to its long axis. Therefore, a voltage can be applied across the electrodes to heat the entire strip to about its $T_s$ temperature. Such strips can be wrapped about and used to heat tubular or irregular conduits or vessels, for example, to thaw their contents, to prevent the salting out of solids in solution, etc.

As indicated supra, in the case of PTC compositions based on crystalline polymers, $T_s$ is related to the crystalline melting point or range of the polymer. Therefore, in principle at least, to achieve a heating element having a specific self-regulating temperature, it is only necessary to select a composition having a base polymer with the desired $T_s$. However, the development of resistance heating elements employing PTC compositions has been hampered by the fact that many otherwise suitable polymers lack thermal or hydrolytic stability at elevated temperatures. One organic polymer that has been found to be very useful in the production of PTC compositions for high temperature applications is the largely head to tail polymer of vinylidene fluoride referred to as polyvinylidene fluoride ($PVF_2$) having the repeat unit $-(CH_2-CF_2-CH_2-CF_2)-$. This crystalline polymer exhibits good thermal stability. In addition it has excellent chemical resistance and is tough, flexible and non-flamable.

The sum of these properties makes $PVF_2$ ideally suited for use as the base polymer in a variety of PTC applications. A $PVF_2$ composition, containing carbon black that has been crosslinked by being irradiated with gamma rays or high energy electrons has been shown to be an excellent PTC composition. The crosslinking by exposure to radiation has been demonstrated to be enhanced by the presence of the carbon. Crosslinking, as is well known to the art, allows the base polymer in a PTC composition to retain its mechanical properties above the crystalline melting point. Without crosslinking, temperature excursions above the crystalline melting point can cause the polymer to flow and, in this condition, its resistance may suddenly drop resulting in runaway heating.

It has been observed that the radiation crosslinked compositions of $PVF_2$ and carbon black exhibiting PTC characteristics described above can be reliably employed in self-regulating heating elements when powered at relatively low voltages, i.e. at about 110 volts or below. However, it has recently been found that this composition when subjected to the higher stresses that accompany the use of higher voltages, undergoes a gradual but irreversible increase in its resistance until it reaches a level at which the heating element no longer gives off sufficient heat to be useful. Therefore, notwithstanding its many advantages, the voltage instability exhibited by $PVF_2$ based PTC compositions have rendered them of little or no utility in many applications tht require voltages above about 110 volts.

Accordingly, in view of the shortcomings of the prior art compositions, it is an object of this invention to provide a novel PTC composition.

Another object of this invention is to provide a PTC composition having enhanced voltage stability.

Another object of this invention is to provide improved self-regulating electrical heating appliances.

The accomplishment of these and other objects will be apparent to those skilled in the art in view of the description of the invention that follows:

SUMMARY OF THE INVENTION

According to the present invention, the aforementioned objects are attained by blending a homopolymer or copolymer having the repeat unit $-\!\!(CH_2\!-\!CF_2)\!\!-$ with conductive carbon black, in an amount sufficient to impart PTC character to the composition, and a polymerizable polyethylenically unsaturated monomer in an amount which will improve the voltage stability of the composition of the invention followed by crosslinking the composition. The resulting compositions exhibit excellent PTC characteristics and have significantly improved voltage stability. The preferred mode of crosslinking is one initiated by ionizing radiation.

DETAILED DESCRIPTION OF THE INVENTION

Figure 1:
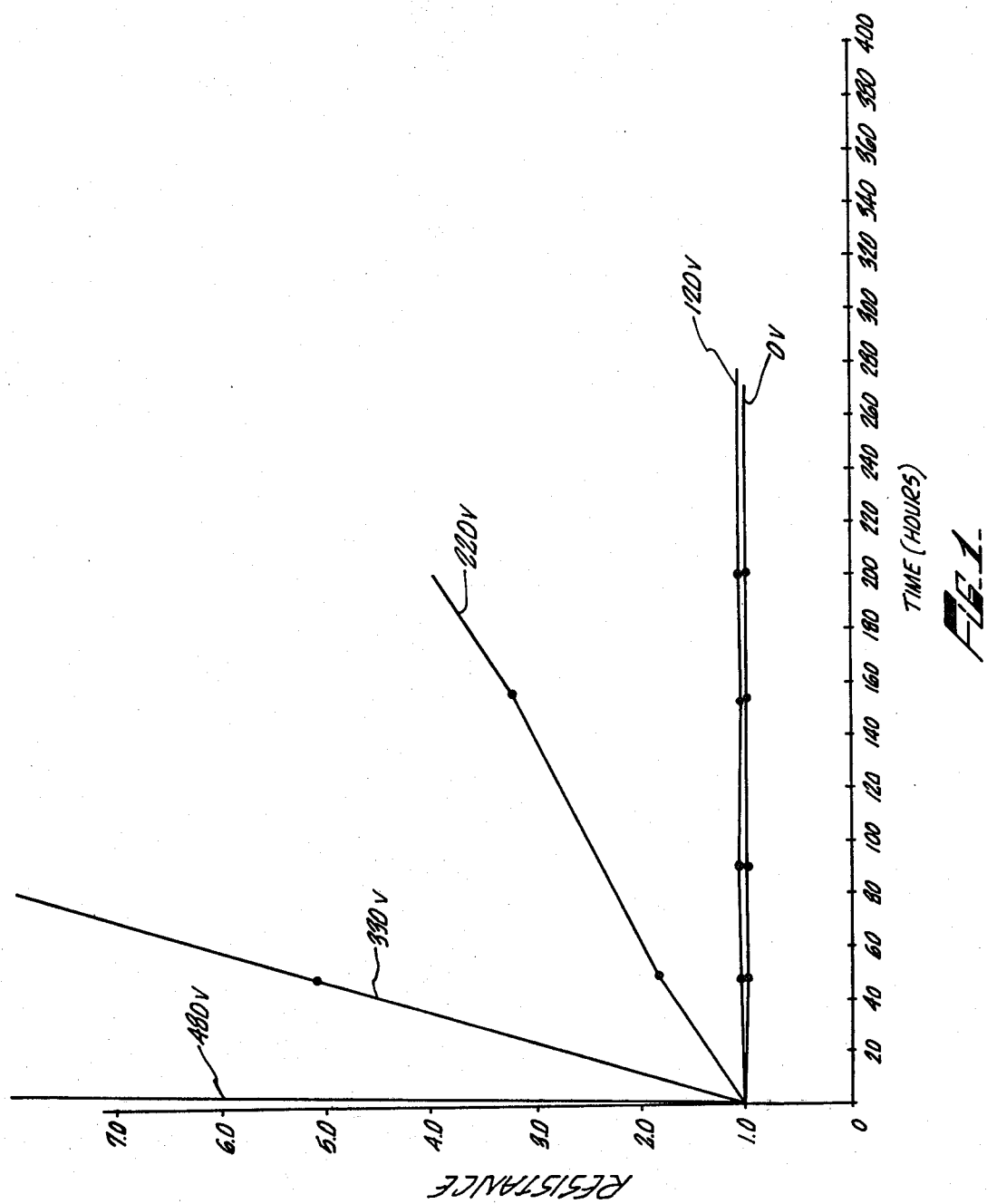
FIGS. 1-4 are graphs showing the effect on the electrical resistance character of PTC compositions when subjected to varying voltages.

The PTC compositions of the present invention in general can be based upon a variety of homopolymers and copolymers containing the repeat unit $-\!\!(CH_2\!-\!CF_2)\!\!-$. Typically, such polymers are obtained by polymerizing vinylidene fluoride, a compound of the formula $CH_2\!=\!CF_2$ by conventional techniques well known to the art. A commercially available homopolymer of vinylidene fluoride, usually referred to as polyvinylidene fluoride (PVF$_2$) is commercially available under the trademark Kynar from the Pennwalt Corporation. PVF$_2$ typically is a polymer in which the $-\!\!(CH_2\!-\!CF_2)\!\!-$ repeating unit is ordered in a head to tail relationship thusly:

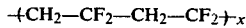

It is within the scope of this invention to employ copolymers of vinylidene fluoride with other olefinically unsaturated comonomers such as ethylene, propylene, haloolefins such as tetrafluoroethylene and the like in amounts that do not too greatly dilute the desirable properties of thermal and hydrolytic stability imparted to the polymer by vinylidene fluoride. Therefore, preferably such copolymers are comprised predominantly of vinylidene fluoride, and more preferably greater than about 80% vinylidene fluoride on a stoichiometric basis.

Yet another polymer within the scope of this invention having the repeat unit $-CH_2\!-\!CF_2-$ in a head-head:tail-tail relationship is derived by copolymerizing tetrafluoroethylene with ethylene to achieve the following arrangement:

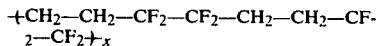

Such a polymer is commercially available under the trademark Tefsel from the Dupont Co. Preferably, this polymer comprises at or near one mole of tetra fluoroethylene per mole of ethylene although larger or smaller amounts can be employed to obtain copolymers useful in the present invention.

Of the polymers hereinbefore described it is presently preferred to employ this homopolymer PVF$_2$ as it exhibits the optimum thermal and hydrolytic stability as well as chemical resistance yet is a flexible and tough resin.

The conductive carbon black useful in the present invention can be selected from a wide variety of such materials known to the prior art including, but not limited to conductive furnace, channel and acetylene blacks. The amount of carbon black required to impart PTC characters to the composition can vary according to specific black employed. However, it is well within the skill of the art to determine, by routine experimentation, effective amounts of carbon black. A presently preferred black is a furnace black sold under the trademark Vulcan XC-72 from Cabot Corporation. Using this material, useful PTC character can be imparted to the composition with amounts that vary over the range from about 4–50% by weight of the composition. It is presently preferred to use 4–12% by weight XC-72 to achieve the base resistance level most useful in self-regulating heating elements of the parallel conductor, flexible strip heater type described more fully infra.

The polymerizable, polyethylenically unsaturated monomers useful in the present invention are those of the character disclosed in Lanza, U.S. Pat. No. 3,580,829, the disclosure of which is incorporated by reference. Characteristically, such monomers are selected for their compatibility with the base polymer and for having a sufficiently low volatility such that they do not escape during processing.

Examples of suitable monomers are the polyallyl esters of carboxylic acids and other acid moieties such as cyanuric acid, e.g. triallyl cyanurate, diallyl aconitate, tetraallyl pyromellitate, triallyl isocyanurate; bis and tris maleimides, e.g. N,N$^1$ - ethylene - bis-maleimide and N, N$^1$ - m - phenylene-bis-maleimide; acrylic and methacrylic esters of polyhydric alcohols, e.g., dipentaerythritol hexamethacrylate, ethylene glycol dimethacrylate, 1,3-butylene glycol dimethacrylate and pentaerythritol tetramethacrylate; vinyl esters of polybasic acids, e.g., trivinyl cyanurate, trivinyl citrate; vinyl and allyl ethers of polyhydric alcohols, e.g. tetra-allyl ether of pentaerythritol and the tetravinyl ether of pentaerythritol; bis acrylamides, e.g., N, N$^1$ -methylene-bis-acrylamide and N, N$^1$-p-phenylene-bis-acrylamide.

Each of the aforementioned monomers possesses a single type of ethylenically unsaturated functional group. It will be appreciated by those skilled in the art that monomers having different functional groups on the same molecule or a mixture of monomers may be used.

The amount of monomer employed necessary to optimize voltage stability can vary according to the nature of the monomer, polymer and carbon employed and the relatie proportions of polymer and carbon in the composition. A presently preferred monomer is trialylisocyanurate (TAIC) and generally compositions that comprise about 1–9% by weight of this monomer is adequate to improve voltage stability. It will be appreciated that more or less monomer may be useful in particular applications. In the case of mixtures of PVF$_2$ and XC-72 carbon black it is presently preferred to employ TAIC in an amount equal to about 3–6% by weight of the composition.

The PTC composition may further comprise other conventional additives normally associated with or employed in polymeric compositions including antioxidants and ultraviolet stabilizers. The polymers of the present invention are also subject to an acid catalyzed breakdown. In many cases the acid is generated by thermal excursions above the temperature at which the polymers are stable. Accordingly, a presently preferred additive is an acid aceptor which may be a basic material or the salt of a strong base and weak acid. It is presently preferred to use calcium carbonate for this purpose in an effective amount (generally up to about 3% by weight of the PTC composition).

Prior to their irradiation, the components of the composition may be blended by methods well known to those skilled in the art using conventional equipment. However, it is preferred to employ blending equipment other than the types that exert a high shearing action such as Banbury mixers and the like. More reproducible results are obtained when mixing techniques of low shearing action are used, particularly in the case of high molecular weight polymers. Such action may be obtained using ball mills, Henschel blenders or extruders, for example, a twin screw extruder. The monomer facilitates blending in that it functions as a plasticizer for the base polymer.

Figure 5:
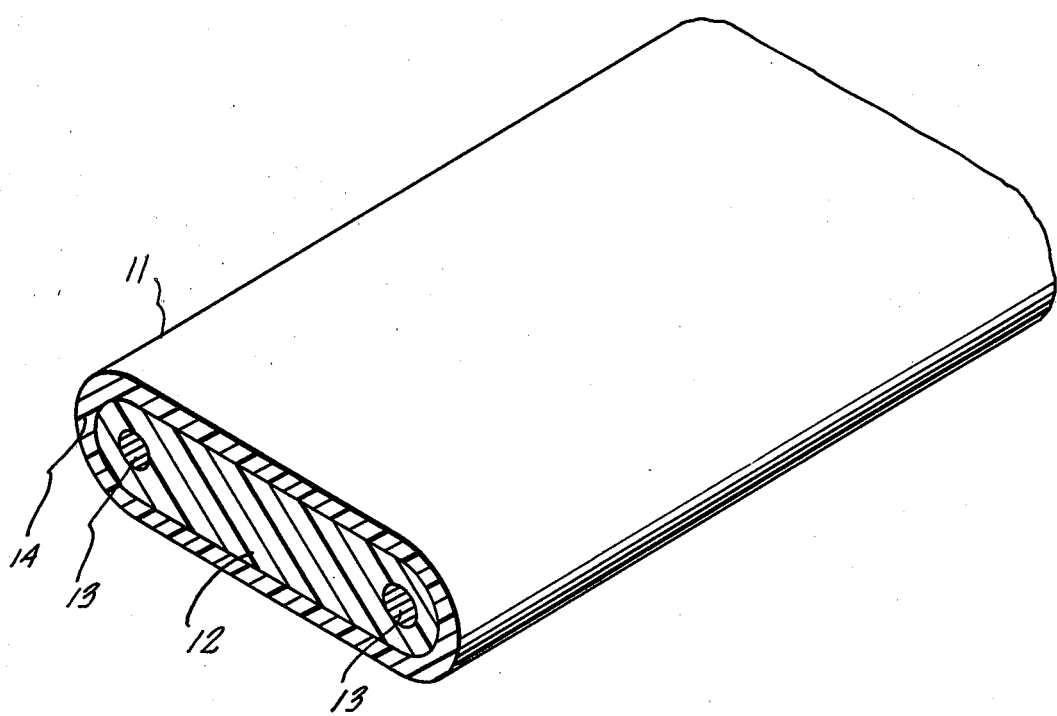
FIG. 5 depicts a self-heating article employing the compositions of the invention.

In a presently preferred application, prior to its irradiation, the blended ingredients are extruded about suitable electrodes and jacketed with a thermoplastic to form an article like that shown in FIG. 5. FIG. 5 is a perspective of a heating element 11 employing a PTC composition of the present invention. In FIG. 5, the PTC composition 12 has been extruded about elongate electrodes 13 of copper or other suitable material, which are coextensive with the heating element and establish a potential gradient across the element and transverse to its long axis. As shown in FIG. 5, a protective outer layer or jacket 14 is extruded over the PTC composition. This jacket is typically a thermoplastic polymer and preferably is not adversely affected by radiation. It should also possess chemical resistance and physical durability to abrasion and the like. The outer layer may be $PVF_2$ or other polymer such as Halar, the trademark for the copolymer of ethylene and $CF_2$—CFCl. Tefzel is also a useful jacketing material.

After jacketing and before its irradiation, the article of FIG. 5 is annealed to relax the stresses in the PTC composition created by the blending and extrusion steps and to allow the carbon black to order itself in its preferred orientations. This is done at a temperature above the crystalline melting or softening point of the base polymer of the PTC composition. The function of the jacket is to prevent the PTC composition from flowing during this treatment. Accordingly, the material of the jacket should have a melting point sufficiently higher than that of the PTC polymer to allow such treatment. The preferred $PVF_2$ used in this invention for the PTC composition has a crystalline melting or softening point at or about 170° C. Annealing may be done at about 180° C. or above, but not higher than the decomposition point of the polymer. Accordingly, an upper temperature of about 240° C. is a practical limit. Preferably annealing is done at about 200° C.

Annealing is done for a period of time that reduces the resistance of the composition to a minimum value. The time can vary but it is preferred to employ times ranging from about 6 to about 24 hours.

When annealing is complete, the PTC composition, for example, as embodied in an article like that of FIG. 5, is cooled to room temperature and irradiated using ionizing radiation which may be gamma radiation or high energy electrons. For ease of manipulation, high energy electons are preferred. The dosage may vary and generally is effective over the range of from about 6–24 megarads. In the case of the compositions based on $PVF_2$, a 12 megarad dosage is presently preferred. Although the preferred method of crosslinking the compositions of the instant invention is by the use of ionizing radiation, it will be realized by those skilled in the art that chemical methods of initiating crosslinking, for example, by using peroxides, can be employed to advantge using techniques well known to the art.

In some instances, it may be desirable to follow the irradiation with a further annealing step which is also conducted above the softening point of the polymer. The temperature ranges previously discussed are applicable in this step as well. Typically annealing at 200° C. for about 90 minutes is adequate. The effect of this annealing process is to raise somewhat and stabilize the base resistance level of the PTC composition. In the case of self-regulating heaters such as the above mentioned flexible strip heaters, the desired resistance at room temperature is from about 2,000–4,000 ohms per foot.

It is contemplated that this final annealing step can be accomplished after installation if the environment in which the article employing the PTC composition is used is caused, for example, by other heating means to exceed the crystalline softening or melting temperature of the base polymer for an appropriate period. In those cases where the inherent flexibility of an element employing the PTC compositions of this invention is exploited by causing it before or after crosslinking, to conform to the shape of the heated article, for example, about a pipe or other vessel, in-service annealing will tend to set the heater element in its new shape thereby reducing its tendency to withdraw from the heated article.

The advantages that flow from the practice of this invention will be apparent from a consideration of the following comparative examples.

EXAMPLES

In the examples that follow, the test samples were prepared in accordance with the procedure described below unless otherwise indicated. The ingredients, expressed in % by weight, were ball milled for two hours and extruded into pellets. Heater core elements like those of FIG. 5 were extruded having a cross-section of approximately $\frac{3}{8}"\times 0.05"$. Embedded in the core were parallel wire electrodes of 18 gauge, 7 strand, tin coated copper wire. A jacket of Tefzel resin (20 mils thick) was extruded over the core. One ft sections were annealed for 24 hours at 200° C. and irradiated with a 12 megarad dose of high energy electrons. Following irradiation, each sample was further annealed at 200° C. for 90 minutes. For each example, one foot sections were aged at 0, 120, 220, 330 and 480 volts and the effect of this aging on resistance measured and graphically recorded. These data are shown in FIGS. 1–4 in which changes in resistance ($\Delta P$) with time at the various voltages are displayed in relative rather than absolute amounts. Initial resistance for each sample is arbitrarily assigned the value of 1.

EXAMPLE 1

Test samples were made as described above from Kynar 451 (83%), a high molecular weight $PVF_2$ (M.I. 0.82) XC-72 carbon black (13%), and $CaCO_3$ (3%) as a stabilizer. The test samples had an initial resistance before aging of 760 ohms/foot. The voltage stability of this composition is displayed graphically in FIG. 1.

EXAMPLE 2

Test samples were made as described above from Kynar 451 (87.5%), XC-72 (8.5%), CaCO$_3$ (3%) and triallyl isocyanurate (1%). The test samples had an initial resistance of 700 ohms/foot. Pelevant voltage stability data are shown in FIG. 2.

Figure 2:
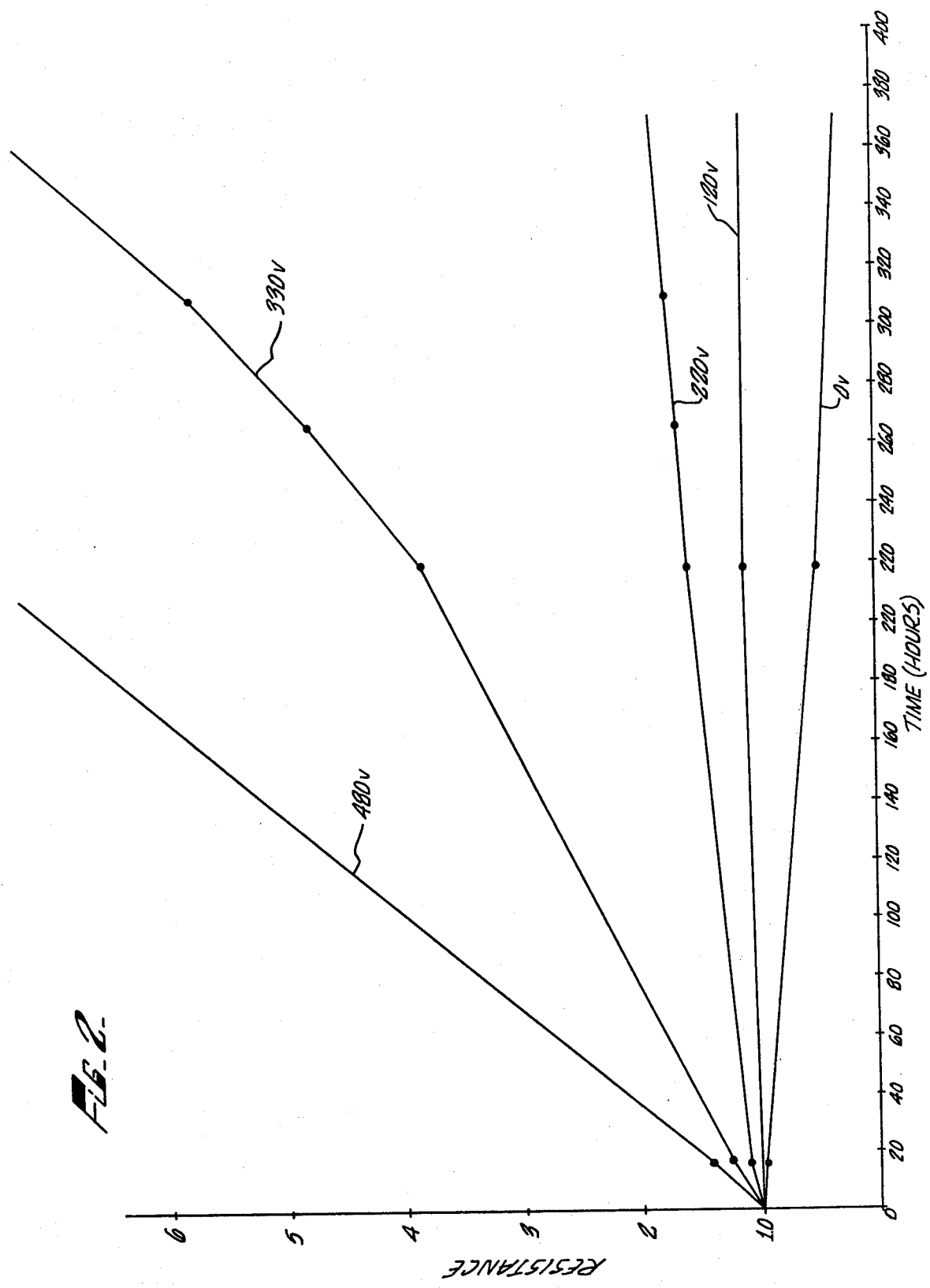

From a comparison of the data of FIGS. 1 and 2, the beneficial effect of including an amount of polyethylenically unsaturated monomer in a PTC composition of low resistance is readily seen. Though stable at 120 volts, the composition of Example 1 exhibited a steep rise in resistance with aging at 220° volts and above. By comparison, the composition of Example 2 was stable to 370 hours at 220 volts and exhibited a less drastic rise in resistance at 330 volts and 480 volts.

EXAMPLE 3

Test samples were made as described above using Kynar 451 (85.5%), XC-72 (11.5%) and CaCO$_3$ (3%). The samples had an initial resistance of 4210 ohms/foot. The voltage stability data are shown in FIG. 3.

EXAMPLE 4

Test samples were made as described above using Kynar 451 (86.5%), XC-72 (7.5%), CaCO$_3$ (3%) and triallyl isocyanurate (3%). The samples had an initial resistance of 4380 ohms/foot. The voltage stability data are shown in FIG. 4.

Figure 3:
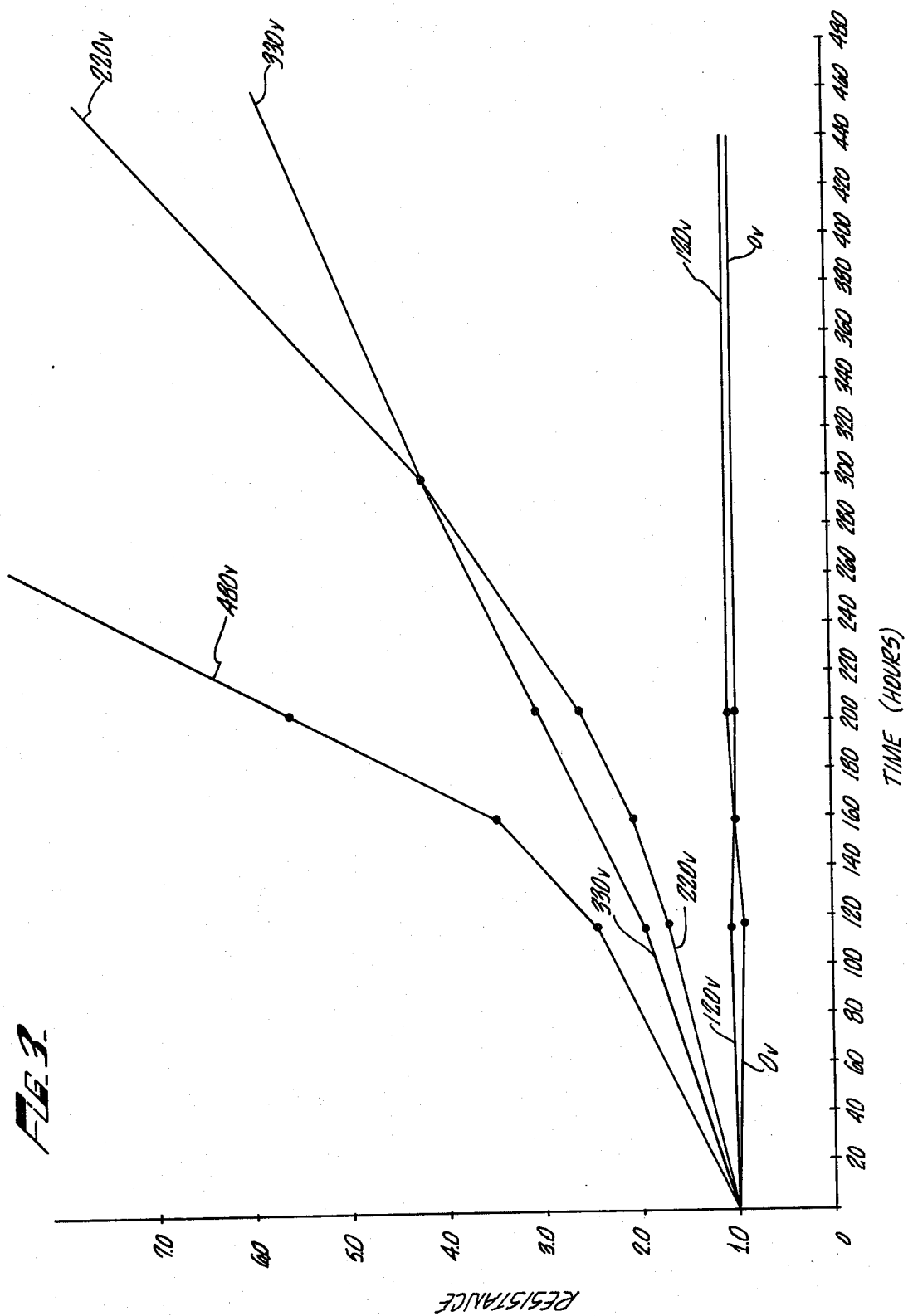
Figure 4:
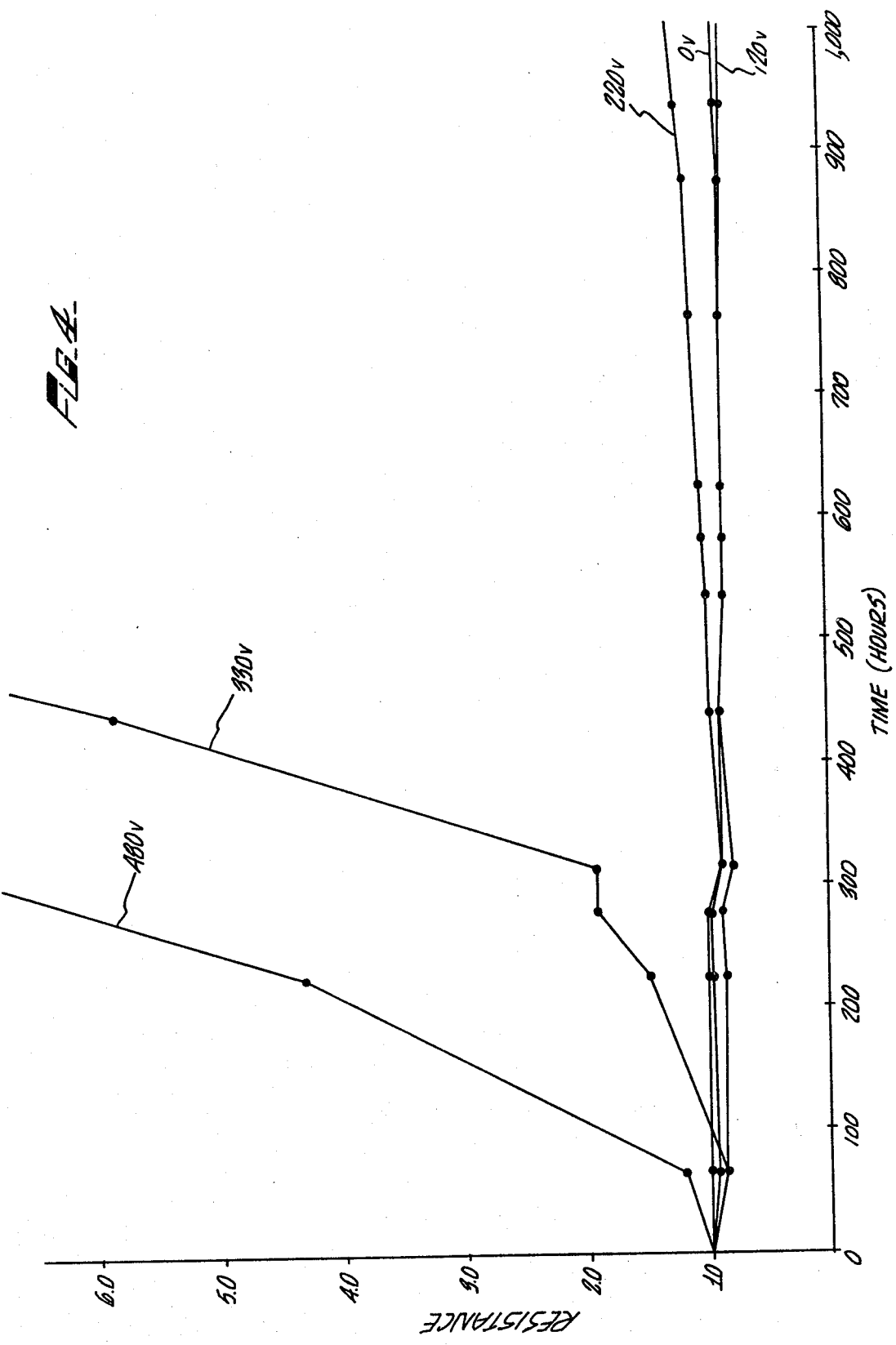

A comparison of FIGS. 3 and 4 clearly show the stabilizing effect on a PVF$_2$ based PTC composition of relatively high resistance of triallyl isocyanurate relative to a composition of similar resistance without it. The composition of Example 3 was relatively stable at 220 volts but suffered a catastrophic rise in resistance when aged at 330 volts. By comparison, the composition of Example 4 containing triallyl isocyanurate was stable to 330 volts for 1000 hours and underwent a much slower increase in resistance at 480 volts than did the composition of Example 3.

EXAMPLE 5

Test samples were made as described above but for the use of a Banbury mixer, rather than a ball mill, using Kynar 901 (83.5%), a lower molecular weight PVF$_2$ than Kynar 451 having a M.I. of 45.6, XC-72 (7.5%), CaCO$_3$ (3%), and triallyl isocyanurate (6%). The resistance before aging of the samples was 4300 ohms/foot. The voltage stability of these samples was comparable to those of Example 4 using Kynar 451 and demonstrates that PVF$_2$ of different molecular weight can be employed in the present invention.

The foregoing has stressed the presently preferred embodiments of the invention. It will be understood by those skilled in the art that modifications can be made that do not depart from the spirit or scope of the invention. For that reason the invention should be regarded as limited only by the claims that follow.

We claim:

1. A method for improving the voltage stability of an electrically conductive composition exhibiting a positive temperature coefficient of resistance, said composition comprising a crosslinked mixture of conductive carbon black and a polymer selected from homopolymers and copolymers comprising the repeat unit $-(CH_2-CF_2)-$, said method comprising:
   (1) mixing said polymer with an amount of conductive carbon black sufficient to impart a positive temperature coefficient of resistance to the composition and render it electrically conductive, and at least one polymerizable polyfunctional unsaturated monomer in an amount sufficient to increase the voltage stability of said composition when said composition is crosslinked and
   (2) crosslinking said composition.

2. A method according to claim 1 wherein said crosslinking is initiated by ionizing radiatior.

3. A method according to claim 1 wherein said crosslinking is initiated by chemical initiators.

4. A method according to claim 1, wherein said polymer is polyvinylidene fluoride homopolymer.

5. A method according to claim 4, wherein said composition comprises 4-12% by weight of conductive carbon black and 1-9% by weight unsaturated monomer.

6. A method according to claim 5 wherein said monomer is triallyl isocyanurate.

7. A method according to claim 5 wherein said monomer is a mixture of monomers.

8. A method according to claim 2 wherein the amount of said radiation varies from about 6-24 megarads.

9. A method according to claim 8 wherein said amount of radiation is 12 megarads.

10. A method according to claim 1 wherein said polymer is a copolymer of vinylidene fluoride and a monomer copolymerizable therewith.

11. A method according to claim 10 wherein said comonomer is tetrafluoroethylene.

12. A method according to claim 1 wherein said polymer is a copolymer of ethylene and tetrafluoroethylene.

13. An electrically conductive composition having a positive temperature coefficient of resistance comprised of a crosslinked mixture of a polymer selected from homopolymers and copolymers comprising the repeat unit $-CH_2-CF_2-$, an amount of carbon black sufficient to impart a positive temperature coefficient of resistance to the composition and render it electrically conductive, and at least one polymerizable polyfunctional unsaturated monomer in an amount sufficient to increase the voltage stability of the composition.

14. A composition according to claim 13 that is crosslinked by ionizing radiation.

15. A composition according to claim 14 that is chemically crosslinked.

16. A composition according to claim 13 wherein said polymer is polyvinylidene fluoride homopolymer.

17. A composition according to claim 16 wherein said composition comprises 4-12% by weight of conductive carbon black and 1-9% by weight of unsaturated monomer.

18. A composition according to claim 17 wherein said monomer is triallyl isocyanurate.

19. A composition according to claim 17 said monomer is a mixture of monomers.

20. A composition according to claim 14 crosslinked by 6-24 megarads of radiation.

21. A composition according to claim 20 crosslinked by 12 megarads.

22. A composition according to claim 13 wherein said polymer is a copolymer of vinylidene fluoride and a monomer copolymerizable therewith.

23. A composition according to claim 22 wherein said comonomer is tetrafluoroethylene.

24. A composition according to claim 13 wherein said polymer is a copolymer of ethylene and tetrafluoroethylene.

25. A self-regulating heating element comprising the composition of claim 13.

26. A self-regulating heating element comprising the composition of claim 14.

27. A self-regulating heating element comprising the composition of claim 16.

28. A self-regulating heating element comprising the composition of claim 18.

29. The method of claim 2 wherein said composition is annealed subsequent to irradiation.

30. A method according to claim 5 wherein said monomer is selected from the group consisting of triallyl cyanurate, diallyl aconitate, tetraallyl pyromellitate, triallyl isocyanurate; N,N$^1$- ethylene-bis-maleimide, N,N$^1$-phenylene-bis-maleimide, dipentaerythritol hexamethacrylate, ethylene glycol dimethacrylate, 1,3-butylene glycol dimethacrylate, pentaerythritol tetramethacrylate, trivinyl cyanurate, trivinyl citrate, the tetraallyl ether of pentaerythritol, the tetravinyl ether of pentaerythritol, N,N$^1$-methylene-bis-acrylamide and N,N$^1$-p-phenylene-bis-acrylamide.

31. A composition according to claim 17 wherein the unsaturated monomer is selected from the group consisting of triallyl cyanurate, diallyl aconitate, tetrallyl pyromellitate, triallyl isocyanurate, N,N$^1$-ethylene-bis-maleimide, N,N$^1$-phenylene-bis-maleimide, dipentaerythritol hexamethacrylate, ethylene glycol dimethacrylate, 1,3-butylene glycol dimethacrylate, pentaerythritol tetramethacrylate, trivinyl cyanurate, trivinyl citrate, the tetraallyl ether of pentaerythritol, the tetravinyl ether of pentaerythritol, N,N$^1$-methylene-bis-acrylamide and N,N$^1$-p-phenylene-bis-acrylamide.

32. A method according to claim 5 wherein said monomer is selected from the group consisting of polyallyl esters of carboxylic acids, polyallyl esters of cyanuric acide, bis and tris maleimides, acrylic and methacrylic esters of polyhydric alcohols, vinyl esters of polybasic acids, vinyl and allyl ethers of polyhydric alcohols and bisacrylamides.

33. A composition according to claim 17 wherein the unsaturated monomer is selected of the group consisting of polyallyl esters of carboxylic acids, polyallyl esters of cyanuric acid, bis and tris maleimides, acrylic and methacrylic esters of polyhydric alcohols, vinyl esters of polybasic acids, vinyl and allyl ethers of polyhydric alcohols and bisacrylamides.

* * * * *